United States Patent [19]

McCready et al.

[11] Patent Number: 4,740,564

[45] Date of Patent: Apr. 26, 1988

[54] THERMOPLASTIC POLYETHERIMIDE ESTERS

[75] Inventors: Russell J. McCready; John A. Tyrell, both of Mt. Vernon, Ind.

[73] Assignee: General Electric Company, Pittsfield, Mass.

[21] Appl. No.: 936,695

[22] Filed: Dec. 2, 1986

[51] Int. Cl.$^4$ .............................................. C08G 8/00
[52] U.S. Cl. .................................. 525/437; 528/289; 528/292; 528/296
[58] Field of Search ............... 525/437; 528/289, 292, 528/296

[56] References Cited

U.S. PATENT DOCUMENTS

| | | | |
|---|---|---|---|
| 4,362,861 | 12/1982 | Shen | 528/289 |
| 4,448,937 | 5/1984 | Bopp et al. | 525/432 |
| 4,544,734 | 10/1985 | McCready | 528/288 |
| 4,552,950 | 11/1985 | McCready | 528/292 |
| 4,556,688 | 12/1985 | McCready et al. | 525/33 |
| 4,556,705 | 12/1985 | McCready | 528/289 |

*Primary Examiner*—Lucille M. Phynes

[57] ABSTRACT

A polyetherimide ester composition comprising the reaction products of:
 (i) at least one diol;
 (ii) at least one dicarboxylic acid or an ester forming reactive derivative thereof; and
 (iii) a set of reactants selected from
  (A) (1) a diamine mixture of at least one high molecular weight poly(oxy alkylene) diamine and at least one low molecular weight hydrocarbylene diamine, and (2) at least one tricarboxylic acid or its derivative, or
  (B) a mixture of at least one high molecular weight polyoxyalkylene diimide diacid and at least one low molecular weight hydrocarbylene diimide diacid.

These compositions are useful for the production of molded and extruded articles.

46 Claims, No Drawings

THERMOPLASTIC POLYETHERIMIDE ESTERS

BACKGROUND OF THE INVENTION

Polyetherimide ester polymers comprised of the reaction products of (a) a diol, (b) a dicarboxylic acid, (c) a high molecular weight poly(oxy alkylene) diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low tensile set, high melting temperatures and/or excellent strength/toughness characteristics as well as superior flexibility, which properties render them especially suitable for molding and extrusion applications.

It has now been discovered that polyetherimide esters exhibiting useful properties can be provided by utilizing a diamine reactant which is comprised of a mixture of a high molecular weight poly(oxy alkylene) diamine and a relatively low molecular weight aromatic or aliphatic diamine.

SUMMARY OF THE INVENTION

In accordance with the instant invention there are provided polyetherimide ester elastomers exhibiting a good mix of useful properties, including improved thermal stability. The polyetherimide esters of the instant invention are comprised of the reaction products of (a) at least one low molecular weight diol, (b) at least one dicarboxylic acid or an ester forming reactive derivative thereof, (c) a diamine mixture comprising at least one high molecular weight poly (oxy alkylene)diamine and at least one low molecular weight hydrocarbylene diamine, and (d) at least one tricarboxylic acid having two vicinal carboxyl groups or a derivative thereof.

DESCRIPTION OF THE INVENTION

In accordance with the instant invention there are provided polyetherimide ester elastomers which exhibit a good mix of substantially most of the advantageous properties of conventional polyetherimide esters which are derived from high molecular weight poly(oxy alkylene)diamines, and which also generally exhibit improved thermal stability.

The polyetherimide ester polymers of the instant invention are comprised of the reaction products of:

(a) at least one low molecular weight diol;

(b) at least one dicarboxylic acid or an ester forming reactive derivative thereof;

(c) a diamine mixture comprised of at least one high molecular weight poly(oxy alkylene)diamine and at least one low molecular weight aliphatic or aromatic diamine; and (d) at least one tricarboxylic acid containing two vicinal carboxylic groups or a derivative thereof.

Suitable diols (a) for use in preparing the polymers of the instant invention include saturated and unsaturated aliphatic and cycloaliphatic dihydroxy compounds as well as aromatic dihydroxy compounds. These diols are preferably of a low molecular weight, i.e., having a molecular weight of about 250 or less. When used herein, the term "diols" and "low molecular weight diols" should be construed as including the equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to about 15 carbon atoms. Some illustrative non-limiting examples of these diols include ethylene-glycol, propanediol, butanediol, pentanediol, 2-methyl propanediol, 2,2-dimethyl propanediol, hexanediol, decanediol, 1,2-dihydroxy cyclohexane, 1,3-dihydroxy cyclohexane, 1,4-dihydroxy cyclohexane, 1,2-cyclohexane dimethanol, 1,3-cyclohexane dimethanol, 1,4-cyclohexane dimethanol, butene diol, hexene diol, etc. Especially preferred are 1,4-butanediol and mixtures thereof with hexanediol, butene diol or cyclohexane dimethanol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy diphenyl, bis(p-hydroxy phenyl)methane, and bis(p-hydroxy phenyl)2,2-propane.

Especially preferred are the saturated aliphatic diols, mixtures thereof and mixtures of a saturated diol(s) with an unsaturated diol(s) such as butene diol, wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present, preferably in a predominant amount, more preferably when 1,4-butanediol is the only diol.

Dicarboxylic acids (b) which are suitable for use in the practice of the present invention are aliphatic, cycloaliphatic, and/or aromatic dicarboxylic acids. These acids are preferably of a low molecular weight, i.e., having a molecular weight of less than about 300; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester forming derivatives such as acid halides and anhydrides. The molecular weight preference mentioned above pertains to the acid and not to its equivalent ester or ester-forming derivative. Thus, an ester of a dicarboxylic acid having a molecular weight greater than 300 is included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids as the term is used herein refers to carboxylic acids having two carboxyl groups each of which is attached to a saturated carbon atom. If the carbon atom to which the carboxyl group is attached is saturated and is in a ring the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present they may be joined by aliphatic or aromatic divalent radicals or radicals such as —O— or —SO$_2$—.

Representative aliphatic and cycloaliphatic acids which can be used for this invention include sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelic acid, diethylmalonic acid, allylmalonic acid, 4-cyclohexene-1,2-dicarboxylic acid, 2-ethylsuberic acid, tetramethylsuccinic acid, cyclopentadienedicarboxylic acid, decahydro-1,5-naphthalene dicarboxylic acid, 4,4'-bicyclohexyl dicarboxylic acid, decahydro-2,6-naphthalene dicarboxylic acid, 4,4-methylene bis(cyclohexane carboxylic acid), 3,4-furan dicarboxylic acid, and 1, 1-cyclobutone dicarboxylic dazelaie acid. Preferred aliphatic acids are cyclohexane dicarboxylic acids, sebacic acid, glutaric acid, azelaic acid and adipic acid.

Representative aromatic dicarboxylic acids which may be used include terephthalic, phthalic, and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof, and mixtures of one or more aromatic dicarboxylic acids with an aliphatic or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (b), be the same dicarboxylic acid or ester derivative thereof. As mentioned above, the preferred compositions are those in which dimethylterephthalate is the predominate dicarboxylic acid, most preferably when dimethylterephthalate is the only dicarboxylic acid.

In the practiee of one embodiment of the present invention the instant polymers are free of dimer acid, i.e., they do not use a dimer acid as one of the reactants, nor is the dimer acid used in the preparation of the instant polymers in conjunction with another dicarboxylic acid.

The diamine mixture (c) used in the preparation of the instant polyetherimide ester elastomers is comprised of a mixture of at least one high molecular weight poly(oxy alkylene)diamine and at least one low molecular weight aromatic or aliphatic diamine. The poly(oxy alkylene)diamines suitable for use herein may be characterized by the following general formula

H$_2$N-G-NH$_2$ wherein G is the radical remaining after the removal of the amino groups of a long chain alkylene ether diamine. These polyether diprimary diamines are available commercially from Texaco Chemical Company under the trademark Jeffamine. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating the glycol with ammonia and hydrogen over a Nickel-Copper-Chromium catalyst as taught by U.S. Pat. No. 3,654,370. Other methods for the production thereof include those taught in U.S. Pat. Nos. 3,155,728 and 3,236,895 and French Pat. Nos. 1,551,605 and 1,466,708, all of which are incorporated by reference.

The long chain ether diamines suitable for use herein are polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly (alkylene ether)diamines including poly (ethylene ether)diamine, poly (propylene ether) diamine, poly(tetramethylene ether) diamine; random or block copolymers of ethylene oxide and propylene oxide including propylene oxide and poly (propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4 butanediol and 1,5-pentanediol and subsequent amination are useful. Especially preferred poly(alkylene ether)diamines are poly(propylene ether) diamine, poly(tetramethylene ether)diamine and poly(ethylene ether) glycols endcapped with poly(propylene ether) glycol and/or propylene oxide and subsequently aminated.

In general, the polyoxyalkylene diamines useful within the scope of the present invention will have an average molecular weight of from about 600 to about 12,000, preferably from about 900 to about 4,000.

The low molecular weight aromatic or aliphatic diamines which comprise the second component of the diamine mixture (c) may be represented by the general formula.

H$_2$N-G'-NH$_2$ wherein G' is a divalent hydrocarbon radical. The preferred divalent hydrocarbon radicals represented by G' are those containing from 2 to about 30 carbon atoms, preferably from 2 to about 20 carbon atoms. G' may be a divalent aromatic hydrocarbon radical, a divalent aliphatic hydrocarbon radical, or a divalent aliphatic-aromatic hydrocarbon radical. The divalent radicals represented by G' include alkylene, alkylidene, alkenylene, cycloalkylene, cycloalkylidene, cycloalkenylene, arylene, alkyl substituted arylene, alkarylene, and aralkylene radicals. The preferred alkylene radicals are those containing from 2 to about 20 carbon atoms. They may be straight chain or branched alkylene radicals.

The preferred alkylidene radicals are those containing from 2 to about 20 carbon atoms. The preferred alkenylene radicals are those containing from 2 to about 20 carbon atoms and from 1 to about 4 carbon-to-carbon double bonds. The double bonds may be isolated or conjugated. The preferred cycloalkylene, cycloalkylidene and cycloalkenylene radicals contain from 4 to about 16 ring carbon atoms. They may also contain alkyl substituent groups on the ring, provided that the total number of carbon atoms present, including the ring carbon atoms and the carbon atoms present in the substituent groups, does not exceed about 20. The cycloalkenylene radicals contain one or two ring carbon-to-carbon double bonds.

The preferred arylene radicals contain from 6 to 12 carbon atoms, i.e., phenylene, naphthalene, and biphenylene. The preferred alkyl substituted arylene radicals contain from 6 to about 20 carbon atoms, i.e., from 6 to 12 ring carbon atoms and alkyl substituent groups. These alkyl substituted arylene radicals include alkyl substituted phenylene, alkyl substituted biphenylene, and alkyl substituted naphthalene. They may contain one or more alkyl substituent groups which may be the same or different. The preferred alkarylene and aralkylene radicals contain from 7 to about 20 carbon atoms.

Also included within the scope of the divalent hydrocarbon radicals represented by G' are the radicals represented by the formula:

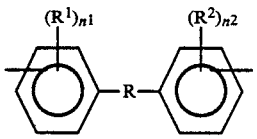

III.

wherein:
R is a divalent hydrocarbon radical selected from $C_2$-$C_8$ alkylene and $C_1$-$C_8$ alkylidene radicals;
$R^1$ and $R^2$ are independently selected from $C_1$-$C_4$ alkyl radicals; and
$n^1$ and $n^2$ are independently selected from positive integers having a value of from 0 to 4 inclusive;

With the proviso that the total number of carbon atoms present does not exceed about 30, preferably about 20.

Some illustrative non-limiting examples of these low molecular weight hydrocarbylene diamines of Formula II include 1,2-ethane diamine, 1,6-hexane diamine; 1,4-butane diamine, 2-methyl-1,4-butane diamine, para-phenylene diamine, meta-phenylene diamine, 1,10-decane dimaine, 1,3-diaminocyclohexane, 1,2-bis-(4-aminophenyl)propane, and the like.

The molecular weight of the divalent hydrocarbon radicals, i.e., hydrocarbylene radicals, represented by $G^1$ is generally 450 or less, preferably 300 or less.

The primary diamines are in general commercially available or may be readily prepared by known methods for the amination of glycols.

The diamine mixture (c) generally contains from about 2 to about 90 weight percent of said low molecular weight hydrocarbylene diamine, preferably from about 3 to about 80 weight percent, and more preferably from about 5 to about 70 weight percent. Weight percent of said low molecular weight aromatic or aliphatic diamine is calculated based on the total amounts by weight of said low molecular weight diamine and said high molecular weight poly(oxy alkylene)diamine present in the diamine mixture (c).

The tricarboxylic acid (d) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic component, any number of suitable tricarboxylic acid constituents will occur to those skilled in the art including 2,6,7-naphthalene tricarboxylic anhydride, 3,3',4-diphenyl tricarboxylic anhydride, 3,3'4-benzophenone tricarboxylic anhydride, 1,3,4-cyclopentane tricarboxylic anhydride, diphenyl sulfone-3,3', 4-tricarboxylic anhydride, ethylene tricarboxylic anhydride, 1,2,5-naphthalene tricarboxylic anhydride, 1,2,4-butane tricarboxylic anhydride, diphenyl isopropylidene-3,3',4-tricarboxylic anhydride, 3,4-dicarboxyphenyl-3-carboxyphenyl ether anhydride, 1,3,4-cyclohexane tricarboxylic anhydride, and the like. These tricarboxylic acid materials can be characterized by the following formula

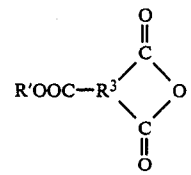

IV.

where $R^3$ is a trivalent organic radical, preferably a $C_2$ to $C_{20}$ aliphatic, aromatic, or cycloaliphatic trivalent organic radical and R' is preferably hydrogen or a monovalent organic radical preferably selected from $C_1$ to $C_6$ aliphatic and/or cycloaliphatic radicals and $C_6$ to $C_{12}$ aromatic radicals. e.g., benzyl, most preferably hydrogen.

The amount by which each of the foregoing reactants is employed in the preparation of the novel polymers of the present invention is not, in general, critical and depends, in part, upon the desired properties of the resultant polymer. Obviously, sufficient amounts of diol versus diacid and tricarboxylic acid versus diamine must be present, as recognized in the art, to allow for substantially complete polymerization.

In general, the amount of diol (a) employed in the practice of the present invention will be a molar excess, preferably about 1.5 molar equivalents, based on the combined molar equivalents of dicarboxylic acid (b) and of the total moles of tricaboxylic acid (d). The amount of tricarboxylic acid (d) employed will preferably be about two molar equivalents based on the number of moles of the diamine (c). Obviously, less than two molar equivalents would result in incomplete imidization of the diamine resulting in potentially poorer properties. Conversely, greater than two molar equivalents of the tricarboxylic acid (d) may lead to cross-linking and branching of the polymer. Generally, mole ratios of 2 moles tricarboxylic acid (d) to 0.85 to 1.15 moles of the diamine mixture (c) have been found to yield useful polymers. Finally, the amount by which the dicarboxylic acid (b) and the diamine (c) are used will be such that the weight ratio of the theoretical amount of diimide diacid formable from the diamine mixture (c) and tricarboxylic acid (d) to the dicarboxylic acid (b) will be from about 0.25 to about 2.0, preferably from about 0.4 to about 1.4.

While the amount of diol will directly affect the degree of polymerization achieved in the polymerization process, the weight ratio of dicarboxylic acid to the theoretical yield of diimide diacid will have the greater impact on the properties of the final polymer. The actual weight ratio employed will be dependent upon the specific diimide diacid used and more importantly, the desired physical and chemical properties of the resultant polyetherimide ester. In general, the lower the ratio of diimide diacid to dicarboxylic acid the better the strength, crystallization and heat distortion properties of the polymer. Alternately, the higher the ratio, the better the flexibility, tensile set and low temperature impact characteristics.

The instant polyetherimide esters may also be prepared by a two-pot reaction involving the reactions of (a) a diol component, (b) a dicarboxylic acid, and (e) a preformed diimide diacid. Basically, in this process the diamine mixture (c) is reacted with a tricarboxylic acid (d) to form a mixture of diimide diacids (e), and said diimide diacids are then reacted with the diol (a) and the dicarboxylic acid (b). Such a two pot synthesis is described in U.S. Pat. No. 4,556,705 to McCready.

The mixture of diimide diacids (e) may be represented by the general formulae

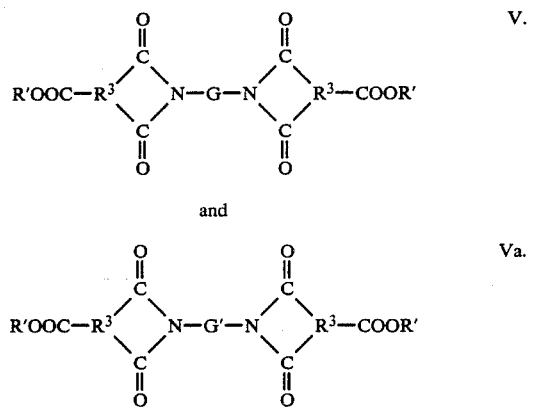

wherein G, G', R' and $R^3$ are as defined hereinafore. The diimide diacids of Formulae V and Va are obtained by the coreaction of the diamine mixture (c) and the tricarboxylic acid component (d). The diimide diacid of Formula V is obtained by the coreaction of the high molecular weight poly(oxy alkylene)diamine with the tricarboxylic acid component while the diimide diacid of Formula Va is obtained by the coreaction of the hydrocarbylene diamine of Formula II with the tricarboxylic acid component (d).

The polyoxyalkylene diimide diacids of Formula V suitable for use herein are high molecular weight diimide diacids wherein the average molecular weight is greater than about 700, most preferably greater than about 900. They may be prepared by the imidization reaction of one or more tricarboxylic acid components (d) containing two vicinal carboxyl groups or an anhydride group and an additional carboxyl group which must be esterifiable with a high molecular weight poly(oxy alkylene)diamine of Formula I. These polyoxyalkylene diimide diacids and processes for their preparation are disclosed in U.S. Pat. No. 4,556,705 to McCready, incorporated herein by reference. Briefly stated, these polyoxyalkylene diimide diacids may be prepared by known imidization reactions including melt synthesis or by synthesizing in a solvent system. Such reactions will generally occur at temperatures from 100° C. to 300° C., preferably at from about 150° C. to about 250° C. while drawing off water in a solvent system at the reflux temperature of the solvent or azeotropic (solvent) mixture.

The diimide diacids of formula Va are prepared in the same manner. In general, the mixture of the two diamines of Formulae I and II are utilized as reactants in the aforedescribed imidization reactions.

In this two-pot process the weight ratio of the above ingredients is not critical. However, it is preferred that the diol be present in at least molar equilavent amounts, preferably a molar excess, most preferably at least 150 mole percent based on the moles of dicarboxylic acid (b) and diimide diacids of Formulae V and Va combined. Such molar excess of diol will allow for optimal yields, based on the amount of acids, while accounting for the loss of diol during esterification/condensation.

Further, while the weight ratio of the dicarboxylic acid (b) to the polyoxyalkylene diimide diacid of Formula V and the hydrocarbylene diimide diacid of Formula Va is not critical preferred compositions are those in which the weight ratio of the combined diimide diacids of Formulae V and Va to dicarboxylic acid (b) is from about 0.25 to about 2, preferably from about 0.4 to about 1.4. The actual weight ratio will be dependent upon the specific diimide diacids used, and more importantly upon the desired physical and chemical properties of the resultant polyetherimide ester.

It is likewise possible, as described in U.S. Pat. No. 4,556,688, to prepolymerize the aromatic dicarboxylic acid (b) and the diol (a) to form a prepolyester. Forming the prepolyester of (a) and (b) can be achieved by conventional esterification techniques as described in U.S. Pat. Nos. 2,465,319, 3,047,439 and 2,910,466, all of which are incorporated herein by reference.

The amounts of the diimide diacids of Formulae V and Va formed will, in general, be related to the amounts of diamines of Formulae I and II employed or present in the diaine mixture (c). Thus, since the amount of diamine of Formula II present in the diamine mixture is from about 2 to about 90 weight percent, preferably from about 3 to about 80 weight percent, and more preferably from about 5 to about 70 weight percent, the amount of diimide diacid of Formula Va formed will generally be from about 2 to about 90 weight percent, preferably from about 3 to about 80 weight percent, and more preferably from about 5 to about 70 weight percent based on the total amounts, by weight, of diimide diacids of Formulae V and Va formed.

In its preferred embodiment, the composition of the present invention comprises the reaction products of dimethylterephthalate, optionally with up to about 40 mole percent of another dicarboxylic acid; 1,4-butanediol, optionally with another diol such as hexanediol, cyclohexane dimethanol, or butenediol; and a mixture of the poly(oxy alkylene) diamine of Formula I and the hydrocarbylene diamine of Formula II, and trimellitic anhydride. In its most preferred embodiments, the diol will be 100 mole % 1,4-butanediol and the dicarboxylic acid will be 100 mole % dimethylterephthalate.

The polyetherimide esters described herein may be prepared by conventional esterification/condensation reactions for the preparation of polyesters. Exemplary of the processes that may be practiced are those set forth, for example, in U.S. Pat. Nos. 3,023,192, 3,763,109, 3,651,014, 3,663,653 and 3,801,547, herein incorporated by reference. Typically, the reactants will be charged into the reactor vessel and heated to 150° C. to 260° C. Heating is continued until methanol and/or water evolution is substantially complete. Depending upon the temperature catalyst and diol excess, this polymerization is complete within a few minutes to a few hours. The low molecular weight prepolymer as produced may subsequently be carried to a high molecular weight polymer by condensation. The polycondensation step entails elevating the temperature to between about 200° C. to 300° C. and decreasing the pressure in the reaction vessel to less than about 30 mm, preferably less than about 5 mm. During polycondensation excess diol is distilled off and additional ester interchange occurs to build the polymer.

The polyetherimide esters of the instant invention contain at least the following three recurring structural units:

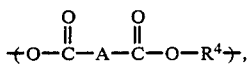

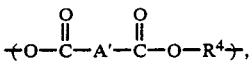

and

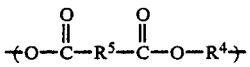

wherein:

$R^4$ is the residue of the diol absent the two hydroxyl groups;

$R^5$ is the residue of the dicarboxylic acid absent the two carboxyl groups;

A is the residue of the polyoxyalkylene diimide diacid minus the two carboxyl groups, i.e.,

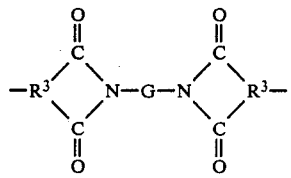

wherein G and $R^3$ are as defined hereinafter; and

A' is the residue of the hydrocarbylene diimide diacid minus the two carboxyl groups, i.e.,

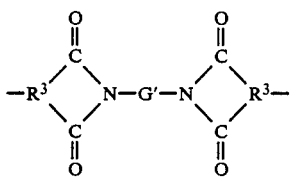

wherein G' and $R^3$ are as defined hereinafore.

The amounts of the recurring structural units of Formula VIa present, based on the total amounts of recurring structural units VI and VIa present, by weight, will be from about 2 to about 70 weight percent, preferably from about 3 to about 60 weight percent, and more preferably from about 5 to about 50 weight percent. This is due to the fact, as discussed hereinafore, that the amounts, by weight, of the diimide diacids of Formula Va formed, based on the total amounts of diimide diacids of Formulae V and Va formed, by weight, is from about 2 to about 90 weight percent, preferably from about 3 to about 80 weight percent, and more preferably from about 5 to about 70 weight percent.

In the process of the instant invention, particularly where all of the reactants are charged to the reactor together or where the diimide diacids are preformed and excess tricarboxylic acid is present, a minor amount of tricarboxylic acid or anhydride may react with available hydroxyl groups and ultimately function as a branching agent in the finished polymer. Within limits, the degree of branching in the finished polymer may be controlled by varying the mole ratio of the tricarboxylic acid to diamine mixture (c). An excess of diamine reduces the degree of branching while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacids are substantially free of branching. If branching is desired one needs only to introduce a branching agent such as trimellitic anhydride along with the diimide diacid. The amount of branching agent generally will be less than about 0.15 moles per mole of diimide diacid. Useful branching agents other than trimellitic anhydride include trimethyl trimellitate, glycerol, trimethylol propane, trimesic acid and its esters, and the like.

Additionally, while not required, it is customary and preferred to utilize a catalyst or catalyst system in the process for the production of the polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used it is preferred and advantageous to render the ester interchange catalyst ineffective following the completion of the precondensation reaction by means of known catalyst inhibitors or quenchers, in particular phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony trioxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, all of which are incorporated herein by reference.

Where the reactants and reactions allow it is preferred to use the titanium catalysts including the inorganic and organic titanium containing catalysts such as those described, for example, in U.S. Pat. Nos.

2,720,502; 2,727,881; 2,729,619; 2,822,348; 2,906,737; 3,047,515; 3,056,817; 3,056,818; and 3,075,952, all of which are incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example zinc acetate, calcium acetate, manganese acetate or antimony tri-oxide, and/or with a catalyst quencher as described above. The catalyst is used in catalytic amounts, i.e., amounts of from about 0.005 to about 2.0 percent by weight based on total reactants.

Both batch and continuous methods can be used for any stage of the etherimide ester polymer preparation. Polycondensation of the polyester prepolymer with the diimide diacids can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetherimide esters of the instant invention possess good resistance towards heat aging and photodegradation, it is advisbale to stabilize these compositions by incorporating therein antioxidants. Many of the oxidative and/or thermal stabilizers known in the art for copolyesters may be used in the practice of the present invention. These may be incorporated into the compositions either during polymerization while in a hot melt-stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,588, incorporated herein by reference.

The instant compositions can be stabilized against ultraviolet radiation by the addition thereto of the well known ultraviolet radiation absorbers such as, for example, the benzophenone and benzotriazole derivatives.

Further, the properties of these polymers can optionally be modified by incorporation of various conventional and well known additives such as fillers such as carbon black, silica gel, alumina, clay, glass fibers, and the like. These may be incorporated in amounts up to 50% by weight, preferably up to about 30% by weight.

The polymers of the instant invention may also optionally contain the well known flame retardants such as, for example, the halogen and/or sulfur containing organic and inorganic compounds.

DESCRIPTION OF THE PREFERRED EMBODIMENT

The following examples are presented to more fully illustrate the present invention. They are presented as illustrative of the present invention and are not to be construed as limiting thereof. In the examples all parts and percentages are on a weight basis unless otherwise specified.

The following examples illustrate the polyetherimide ester polymers of the instant invention.

EXAMPLE 1

The following diimide diacids are prepared by the imidization of trimellitic anhydride with a primary diamine:

Diimide Diacid A

A high molecular weight polyoxyalkylene diimide diacid is prepared by the imidization of 48.8 parts by weight of trimellitic anhydride with 250 parts by weight of JEFFAMINE D2000 (a propylene ether diamine having an average molecular weight of 2,000, marketed by Texaco Chemical Co.).

Diimide Diacid B

An aromatic diimide diacid is prepared by the imidization of 384 parts by weight of trimellitic anhydride with 108 parts by weight of p-phenylenediamine in a 400:100 part mixture of dimethylformamide: xylene heated at 180° C. to remove water via an azeotrope. After the theoretical amount of water is removed the solution is cooled and suction filtered to isolate the diimide diacid.

Diimide Diacid C

An aromatic diimide diacid is prepared by the imidization of 153 parts by weight trimellitic anhydride with 54 parts by weight of m-xylylenediamine substantially in accordance with the procedure for Diimide Diacid B.

Diimide Diacid D

An aromatic diimide diacid is prepared by the imidization of 384 parts by weight of trimellitic anhydride with 108 parts by weight of m-phenylenediamine substantially in accordance with the procedure for Diimide Diacid B.

Diimide Diacid E

An aliphatic diimide diacid is prepared by the imidization of 614 parts by weight of trimellitic anhydride with 186 parts by weight of 1,6-hexanediamine substantially in accordance with the procedure for Diimide Diacid B.

EXAMPLE 2

Into a reactor vessel are placed 210 parts by weight of butane diol, 280 parts by weight of dimethyl terephthalate, 105 parts by weight of Diimide Diacid A, 105 parts by weight of Diimide Diacid E, a phenolic antioxidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The Flexural Modulus (test method ASTM D790), Tensile Strength (test method ASTM D638), Tensile Elongation (test method ASTM D638), Notched Izod (test method ASTM D256), Melt Viscosity, and Melting Point (°C.) of the polymer are determined and the results are set forth in Table I.

EXAMPLE 3

Into a reactor vessel are placed 210 parts by weight of butane diol, 280 parts by weight of dimethyl terephthalate, 21 parts by weight of Diimide Diacid A, 189 parts by weight of Diimide Diacid E, a phenolic antioxidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The properties of this polymer are determined as in Example 2 and the results are set forth in Table I.

EXAMPLE 4

Into a reactor vessel are placed 210 parts by weight of butane diol, 280 parts by weight of dimethyl terephthalate, 106 parts by weight of Diimide Diacid A, 53 parts by weight of Diimide Diacid D, 47 parts by weight of Diimide Diacid E, a phenolic antioxidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The properties of the polymer are determined as in Example 2 and the results are set forth in Table I.

EXAMPLE 5

Into a reactor vessel are placed 224 parts by weight of butane diol, 280 parts by weight of dimethyl terephthalate, 47 parts by weight of Diimide Diacid A, 93 parts by weight of Diimide Diacid C, a phenolic antioxidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The properties of the polymer are determined as in Example 2 and the results are set forth in Table I.

EXAMPLE 6

Into a reactor vessel are placed 224 parts by weight of butanediol, 280 parts by weight of dimethyl terephthalate, 323 parts by weight of Diimide Diacid A, 32 parts by weight of Diimide Diacid C, a phenolic antioxidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The properties of the polymer are determined as in Example 2 and the results are set forth in Table I.

EXAMPLE 7

Into a reactor vessel are placed 210 parts by weight of butanediol 280 parts by weight of dimethyl terephthalate, 106 parts by weight of Diimide Diacid A, 99 parts by weight of Diimide Diacid D, a phenolic antixoidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The properties of the polymer are determined as in Example 2 and the results are set forth in Table I.

EXAMPLE 8

Into a reactor vessel are placed 210 parts by weight of buatnediol, 280 parts by weight of dimethyl terephthalate, 106 parts by weight of Diimide Diacid A, 99 parts by weight of Diimide Diacid B, a phenolic antioxidant, and a titanium catalyst. The mixture is heated to about 180° C. whereupon methanol is generated. After the theoretical amount of methanol is removed the pot temperature is increased to about 250° C. and vacuum applied to form the polyetherimide ester polymer.

The properties of the polymer are determined as in Example 2 and the results are set forth in Table I.

TABLE I

| Example No. | Flexural Modulus (psi) | Tensile Elongation (%) | Tensile Strength (psi) | Notched Izod (lb/in/in) | Melt Viscosity | Melting Point (deg. C.) |
|---|---|---|---|---|---|---|
| 2 | 107,000 | 536 | 6,240 | — | 1,385 | 198 |
| 3 | 243,200 | 493 | 8,000 | — | 1,672 | 189 |
| 4 | 117,000 | 376 | 3,797 | 2 | 1,692 | 200 |
| 5 | 192,000 | 410 | 5,000 | 1.8 | 3,128 | 206 |
| 6 | — | — | — | — | 1,455 | 199 |
| 7 | 117,175 | 185 | 4,224 | 2.4 | 1,458 | 205 |
| 8 | 103,000 | 157 | 3,700 | 4 | — | — |

The amounts, as set forth hereinafore, of the low molecular weight diamine present in the diamine mixtures, or the amounts of the low molecular weight diimide diacid present in the diimide diacid mixtures, are generally effective to at least improve or postively upgrade the thermal stability of the polyetherimide ester polymers of the instant invention.

In a preferred embodiment of the instant invention the polyetherimide ester polymers are free of dimer acids, particularly high molecular weight dimer acids, either as reactants used in forming the polymers or as an additional component of said polymers.

Obviously, other modifications and variations of the present invention are possible in light of the above teachings. It is, therefore, to be understood that changes may be made in the particular embodiments of the invention as described herein which are within the full intended scope of this invention as defined by the appended claims.

What is claimed is:

1. A polyetherimide ester composition comprising the reaction products of:
    (i) at least one diol;
    (ii) at least one dicarboxylic acid or an ester forming reactive derivative thereof; and
    (iii) a set of reactants selected from
        (A) (1) a diamine mixture of at least one high molecular weight poly(oxy alkylene) diamine and at least one low molecular weight hydrocarbylene diamine, and (2) at least one tricarboxylic acid or its derivative, or
        (B) a mixture of at least one high molecular weight polyoxyalkylene diimide diacid and at least one low molecular weight hydrocarbylene diimide diacid.

2. The composition of claim 1 wherein (iii) is (A).

3. The composition of claim 2 wherein said diamine mixture (iii) (A) (1) contains from about 2 to about 90 weight percent of said hydrocarbylene diamine.

4. The composition of claim 3 wherein said diamine mixture contains from about 3 to about 80 weight percent of said hydrocarbylene diamine.

5. The composition of claim 4 wherein said diamine mixture contains from about 5 to about 70 weight percent of said hydrocarbylene diamine.

6. The composition of claim 2 wherein said poly(oxy alkylene)diamine is represented by the formula

wherein G is the radical remaining after the removal of the amino groups of a long chain alkylene ether diamine and the poly(oxy alkylene)diamine has an average molecular weight of from about 600 to about 12,000.

7. The composition of claim 6 wherein said poly(oxy alkylene)diamine has an average molecular weight of from about 900 to about 4,000.

8. The composition of claim 6 wherein said poly(oxy alkylene)daimine is selected from poly (ethylene ether)diamine, poly(propylene ether)diamine, poly(tetramethylene ether)diamine, copoly(propylene ether-ethylene ether)diamine, or mixtures thereof.

9. The composition of claim 6 wherein said hydrocarbylene diamine is represented by the formula $$H_2N-G'-NH_2$$

wherein G' is a divalent hydrocarbon radical.

10. The composition of claim 9 wherein said divalent hydrocarbon radical represented by G' contains from 2 to about 30 carbon atoms.

11. The composition of claim 10 wherein said divalent hydrocarbon radical represented by G' contains from 2 to about 20 carbon atoms.

12. The composition of claim 11 wherein said divalent hydrocarbon radical represented by G' is selected from alkylene, alkenylene, alkylidene, cycloalkylene, cycloalkylidene, cycloalkenylene, arylene, alkyl substituted arylene, alkarylene, or aralkylene radicals.

13. The composition of claim 12 wherein G' is selected from alkylene radicals.

14. The composition of claim 1 wherein the diol component (i) is a $C_2$ to $C_{19}$ aliphatic or cycloaliphatic diol or a mixture thereof.

15. The composition of claim 14 wherein said diol component (i) contains at least 1,4-butanediol.

16. The composition of claim 15 wherein said diol component (i) contains a mixture of 1,4-butanediol and another diol selected from hexanediol, cyclohexane dimethanol or butenediol.

17. The composition of claim 14 wherein said diol component (i) contains 100 mole % 1,4-butanediol.

18. The composition of claim 1 wherein said dicarboxylic acid component (ii) is selected from $C_2$-$C_{19}$ aliphatic, cycloaliphatic, or aromatic dicarboxylic acids or the ester forming reactive derivatives thereof.

19. The composition of claim 18 wherein said dicarboxylic acid is an aromatic dicarboxylic acid or its ester forming reactive derivative.

20. The composition of claim 19 wherein said dicarboxylic acid is dimethyl terephthalate.

21. The composition of claim 1 wherein the tricarboxylic acid (iii)(A)(2) is represented by the formula

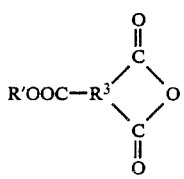

wherein:
$R^3$ is a $C_2$ to $C_{20}$ trivalent aliphatic, cycloaliphatic, or aromatic organic radical; and
R' is hydrogen or a $C_1$ to $C_6$ aliphatic monovalent organic radical.

22. The composition of claim 21 wherein said tricarboxylic acid is trimellitic anhydride.

23. The composition of claim 1 wherein (iii) is (B).

24. The composition of claim 23 wherein said diimide diacid mixture contains from about 2 to about 90 weight percent of said hydrocarbylene dimiide diacid.

25. The composition of claim 24 wherein said diimide diacid mixture contains from about 3 to about 80 weight percent of said hydrocarbylene diimide diacid.

26. The composition of claim 25 wherein said diimide diacid mixture contains from about 5 to about 70 weight percent of said hydrocarbylene diimide diacid.

27. The composition of claim 24 wherein said high molecular weight polyoxyalkylene diimide diacid is represented by the formula

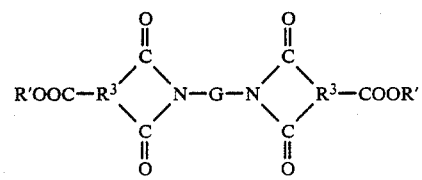

wherein:
G is the radical remaining after the removal of the amino groups of a long chain poly(oxy alkylene) diamine having an average molecular weight of from about 600 to about 12,000;
$R^3$ is a $C_2$ to $C_{20}$ trivalent aliphatic, cycloaliphatic, or aromatic organic radical; and
R' is hydrogen or a $C_1$ to $C_6$ aliphatic monovalent organic radical.

28. The composition of claim 27 wherein $R^3$ is a $C_6$ trivalent aromatic hydrocarbon radical, R' is hydrogen, and G is the radical remaining after the removal of the amino groups of a long chain poly(oxy alkylene)diamine having an average molecular weight of from about 900 to about 4,000.

29. The composition of claim 27 wherein said hydrocarbylene diimide diacid is represented by the formula

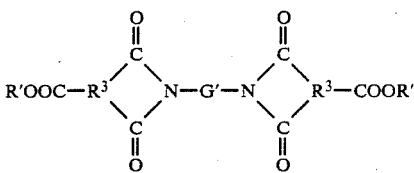

wherein G' is a divalent hydrocarbon radical containing from 2 to about 30 carbon atoms.

30. The composition of claim 29 wherein G' is a divalent hydrocarbon radical containing from 2 to about 20 carbon atoms.

31. The composition of claim 30 wherein said divalent hydrocarbon radical is selected from alkylene, alkenylene, alkylidene, cycloalkylene, cycloalkenylene, cycloalkylidene, arylene, alkyl substituted arylene, aralkylene, or alkarylene radicals.

32. The composition of claim 31 wherein $R^3$ is $C_6$ trivalent aromatic hydrocarbon radical and R' is hydrogen.

33. The composition of claim 1 wherein the weight ratio of the diimide diacid to the dicarboxylic acid is from about 0.25 to about 2.

34. The composition of claim 33 wherein said weight ratio is from about 0.4 to about 1.4.

35. A polyetherimide ester polymer comprised of at least the following recurring structural units:

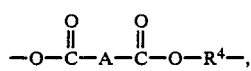 (a)

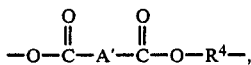 (b)

and

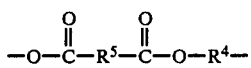 (c)

wherein $R^4$ is the residue of a $C_2$–$C_{15}$ diol absent the two hydroxyl groups, $R^5$ is the residue of a dicarboxylic acid absent the two carboxyl groups, A is the residue of a high molecular weight polyoxyalkylene diimide diacid absent the two carboxyl groups, and A' is the residue of a low molecular weight hydrocarbylene diimide diacid absent the two carboxyl groups.

36. The polymer of claim 35 which contains from about 2 to about 90 weight percent of recurring structural unit (b), based on the total amounts, by weight, of recurring structural units (a) and (b) present.

37. The polymer of claim 36 which contains from about 3 to about 80 weight percent of recurring structural unit (b).

38. The polymer of claim 37 which contains from about 5 to about 70 weight percent of recurring strcutural unit (b).

39. The composition of claim 36 wherein A is represented by the formula

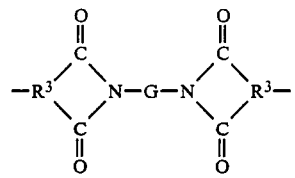

wherein $R^3$ is a $C_2$ to $C_{20}$ trivalent aliphatic, cycloaliphatic, or aromatic organic radical, and G is the radical remaining after the removal of the amino groups of a long chain poly(oxy alkylene) diamine having an average molecular weight of from about 600 to about 12,000.

40. The polymer of claim 39 wherein $R^3$ is the trivalent $C_6$ aromatic hydrocarbon radical and G is the radical remaining after removal of amino groups of a poly(oxy alkylene)diamine having an average molecular weight of from about 900 to about 4,000.

41. The polymer of claim 39 wherein A' is represented by the formula

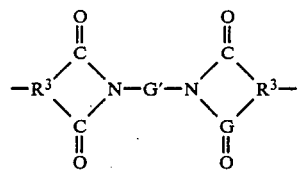

wherein G' is a divalent hydrocarbon radical containing from 2 to about 30 carbon atoms.

42. The polymer of claim 41 wherein G' is a divalent hydrocarbon radical containing from 2 to about 20 carbon atoms.

43. The polymer of claim 41 wherein $R^5$ is the residue of an aromatic dicarboxylic acid.

44. The polymer of claim 43 wherein $R^5$ is the residue of dimethyl terephthalate.

45. The polymer of claim 43 wherein $R^4$ is the residue of an aliphatic diol.

46. The polymer of claim 45 wherein $R^4$ is the residue of 1,4-butanediol.

* * * * *